United States Patent [19]
Yamanaka

[11] Patent Number: 5,347,363
[45] Date of Patent: Sep. 13, 1994

[54] EXTERNAL LEAD SHAPE MEASUREMENT APPARATUS FOR MEASURING LEAD SHAPE OF SEMICONDUCTOR PACKAGE BY USING STEREOSCOPIC VISION

[75] Inventor: Kazuyuki Yamanaka, Fujisawa, Japan

[73] Assignee: Kabushiki Kaisha Toshiba, Kanagawa, Japan

[21] Appl. No.: 918,064

[22] Filed: Jul. 24, 1992

[30] Foreign Application Priority Data

Jul. 25, 1991 [JP] Japan .................... 3-186533

[51] Int. Cl.$^5$ .................... G01B 11/24; H04N 7/18
[52] U.S. Cl. .................... 356/376; 356/2; 356/237; 348/126; 348/139
[58] Field of Search .................... 356/237, 394, 2, 376; 358/88, 101, 106, 107

[56] References Cited

U.S. PATENT DOCUMENTS

| | | | |
|---|---|---|---|
| 2,449,542 | 9/1948 | Ayres et al. | 358/88 X |
| 3,619,065 | 11/1971 | Agnew | 356/394 X |
| 3,726,591 | 4/1973 | Helava et al. | 356/2 |
| 3,959,580 | 5/1976 | Choco et al. | 358/88 |
| 4,654,699 | 3/1987 | Medina | 358/88 |
| 4,654,872 | 3/1987 | Hisano et al. | 358/88 X |
| 4,815,819 | 3/1989 | Mayhew et al. | 358/88 X |
| 4,819,064 | 4/1989 | Diner | 358/88 |
| 4,872,052 | 10/1989 | Liudzius et al. | 356/394 X |
| 4,966,436 | 10/1990 | Mayhew et al. | 358/88 X |
| 4,982,438 | 1/1991 | Usami et al. | 356/2 X |
| 5,065,236 | 11/1991 | Diner | 358/88 |
| 5,105,149 | 4/1992 | Tokura | 358/106 X |
| 5,243,406 | 9/1993 | Ando et al. | 356/394 X |
| 5,249,035 | 9/1993 | Yamanaka | 356/376 |

FOREIGN PATENT DOCUMENTS

| | | | |
|---|---|---|---|
| 0036004 | 4/1981 | Japan | 356/394 |
| 0199291 | 10/1985 | Japan | 358/88 |
| 0199293 | 10/1985 | Japan | 358/88 |
| 0201792 | 10/1985 | Japan | 358/88 |
| 0213192 | 10/1985 | Japan | 358/88 |
| 0214185 | 10/1985 | Japan | 358/88 |
| 0236394 | 11/1985 | Japan | 358/88 |
| 0239040 | 10/1987 | Japan | 356/394 |
| 0075545 | 4/1988 | Japan | 356/237 |
| 0073242 | 3/1989 | Japan | 356/237 |
| 0107247 | 4/1989 | Japan | 358/88 |
| 0202608 | 8/1989 | Japan | 356/327 |
| 0010204 | 1/1990 | Japan | 356/394 |
| 0195906 | 8/1991 | Japan | 356/394 |

*Primary Examiner*—James C. Housel
*Assistant Examiner*—Milton I. Cano
*Attorney, Agent, or Firm*—Finnegan, Henderson, Farabow, Garrett & Dunner

[57] ABSTRACT

A lead shape measurement apparatus includes a first perspective imaging device for photographing external leads to be measured, from an oblique direction; a second perspective imaging device for photograping external leads to be measured, from an oblique direction different from that of the first perspective imaging device and so as to include a same photographic field of vision as the first perspective device; a first measurement point determination element for determining a center point of two intersecting virtual straight lines which intersect two ridges of the external leads to be measured in an image plane by photography of the first perspective imaging device; a second measurement point determination element for setting epipolar line in the image plane by the second perspective imaging device on the basis of sight lines when a measurement sampling point of the first perspective imaging device is photographed, and for determining a center point of two intersecting virtual straight lines which intersect two ridges of the external leads to be measured in an image plane and which exists upon the epipolar line; and a coordinate obtaining element for obtaining each of a plurality of the measurement sampling points which are set for measuring a three-dimensional shape of the external leads.

12 Claims, 12 Drawing Sheets

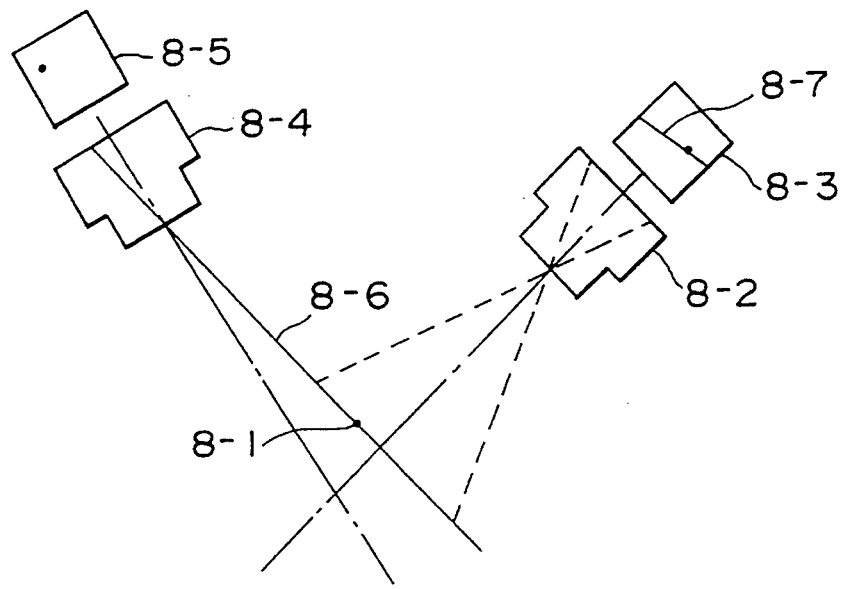
F I G. 10
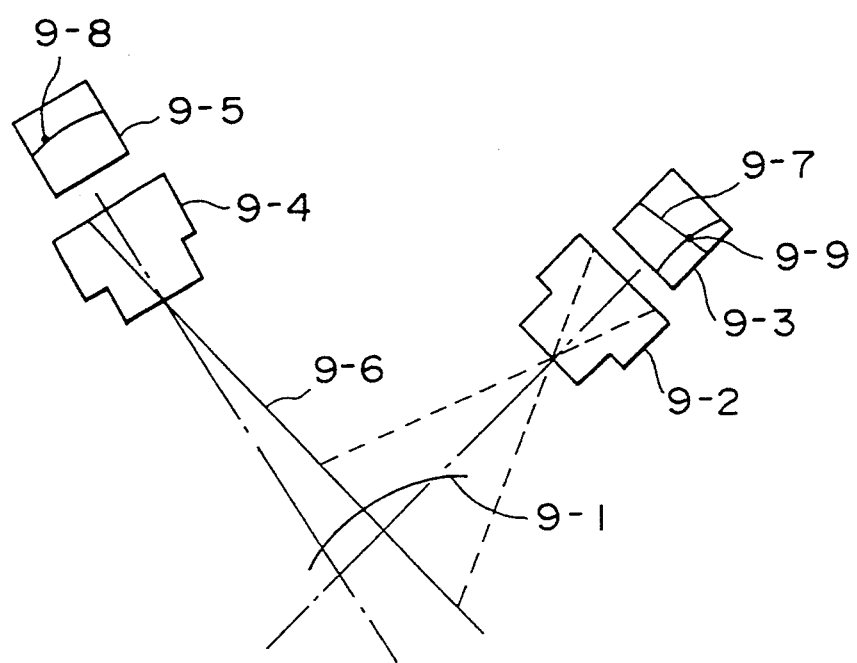
F I G. 11

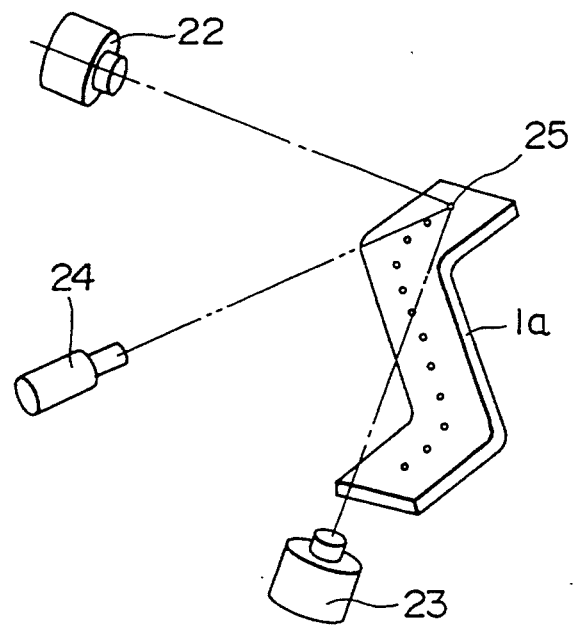
F I G. 15

EXTERNAL LEAD SHAPE MEASUREMENT APPARATUS FOR MEASURING LEAD SHAPE OF SEMICONDUCTOR PACKAGE BY USING STEREOSCOPIC VISION

BACKGROUND OF THE INVENTION

The present invention relates to lead shape measurement apparatus which are used in the measurement of shapes of the various types of external leads such as J-shaped external leads and curved external leads provided with crank shapes for QFP (a quadrivial-leads flat package which means flat packages with leads in four directions) and the like, and more particularly, relates to lead shape measurement apparatus which are used for the non-contact accurate measurement through image recognition of curved shapes across large areas from the vicinity of the root of an external lead to the distal end.

Conventionally, there have been apparatus which measure curves in the horizontal direction, lengths and curves in the vertical direction of external leads in semiconductor packages. The results of these measurements were then used to determine whether the product clears quality management standards for the products. Such results were also used in the adjustment of apparatus. For example, external leads have press processes executed so that they are made into the required shapes and the measurements are used to adjust the pressure, stroke and other parameters for the press, as well as for adjustment of the shape and contact status of molds.

Such lead shape measurement apparatus have included apparatus for measurement through recognition of an arbitrary positioning of a semiconductor package, such as the positions of a distal end of an external lead in the horizontal plane for example.

FIG. 1 shows one example of an apparatus which performs measurement of semiconductor package external leads which are curved in a crank shape in the horizontal plane.

In this figure, the numeral 1 is a semiconductor package to be measured, 1a is an external lead, and 2 and 3 are television cameras which are placed horizontally to the package 1 and which photograph the external leads 1a, 1a. One television camera 2 photographs a horizontal image of the external leads 1a, 1a from above, and the television camera 3 photographs a frontal elevation image of the external leads 1a, 1a of the package 1 from the side.

The numeral 4 is an image plane for the television camera 2, and the numerals 41a, 41a, . . . indicate the external leads 1a,1a in the image plane 4. As can be seen from the image plane 4, the image information from the television camera 2 enables measurement of the length and the curvature in the horizontal direction and which is called skew, for the external leads 1a, 1a.

The numeral 5 is an image plane of a television camera 3 and the numerals 51a, 51a, . . . indicate the external leads 1a, 1a in the image plane 5. In the same manner, as can be seen from the image plane 5, the image information from the television camera 3 enables measurement of the rise and fall in the vertical direction, for the external leads 1a, 1a.

The numeral 6 is an image processing apparatus and calculates the length and the curvature in the horizontal direction, and the rise and fall in the vertical direction on the basis of the image information from the television cameras 2, 3 from the respective image planes 4, 5.

However, what can be measured by this apparatus ultimately returns to the three-dimensional positions of the distal end portions of all of the external leads. This is to say that it is possible to measure only one quantity for the entire shape of the external leads, and for example, it is not possible to measure the entire shape of a radius of curvature of a curve, or the angle of each side of an external lead which is bent in a crank shape.

Because of this, an apparatus having the configuration shown in FIG. 2 has been proposed and is in practical use.

In this figure, the numeral 7 denotes a television camera 7, and a package 1 is placed horizontally, and an image of the external lead 1a when seen from the side of the package 1 is photographed by the television camera 7. The numeral 8 denotes that image plane, and the numeral 81a denotes the image of the external lead 1a inside that image plane 8, while the numeral 9 denotes an image processing apparatus 9 which calculates the related quantities on the basis of the image information shown in the image plane 8. As can be seen from the image plane 8, depending upon the image information from the television camera 7, it is possible to measure the entire shape of a radius of curvature of a curve, or the angle of each side of an external lead 1a.

However, in the case of this apparatus, there is the disadvantage that for all of the external leads 1a, 1a, it is only possible to measure the position of the frontmost portion with respect to the television camera 7, and it is not possible to have measurement for all portions.

Moreover, in the case when it is necessary to know the shape of all leads, this conventionally involved much trouble, and required inefficient work such as making measurements for one lead, and that external lead 1a being cut off after measurement and measurement being performed for the external lead 1a which was then positioned at the front.

SUMMARY OF THE INVENTION

In order to solve the above problems included in the above prior art, an object of the present invention is to provide a lead shape measurement apparatus capable of automatically measuring a three-dimensional shape of all external leads which are provided with one semiconductor package.

A lead shape measurement apparatus according to the present invention comprises a first perspective imaging apparatus which photographs external leads to be measured, from an angle, a second perspective imaging apparatus which photographs external leads to be measured, from an angle differing from that of said first perspective imaging apparatus and so as to include a same photographic field of vision as the first oblique image photographing apparatus, first measurement point determination means which determines a center point of two intersecting virtual straight lines which intersect two ridges of the external leads to be measured in an image plane by photography of the first perspective imaging apparatus, second measurement point determination means which in an image plane by the second perspective imaging apparatus, sets an epipolar line on the basis of sight lines when the measurement sampling point of the first perspective imaging apparatus is photographed, and determines a center point of two intersecting virtual straight lines which intersect two ridges of the external leads to be measured in the image plane and which is dependent upon the epipolar line, and the measurement sampling points being set in a plural number and each three-dimensional coordinate determined, with those three-dimensional coordinate groups being used as the basis for measurement of a three-dimensional shape of the external leads to be measured.

In addition to the above basic configuration, the lead shape measurement apparatus of a first aspect of the present invention comprises first and second measurement point determination means provided with means which handles a contour line of external leads to be measured, as a ridge which is an object of recognition.

In addition to the above basic configuration, in the lead shape measurement of a second aspect of the present invention, first and second measurement point determination means are provided with means which handles a line of an edge of said external leads to be measured, as a ridge which is an object of recognition.

In addition to the basic configuration and the first and second aspects, the lead shape measurement apparatus of a third aspect of this invention is additionally provided with a position adjustment means which changes a relative position relationship between an external lead to be measured, and first and second perspective imaging apparatus.

In addition to the basic configuration and the first and second aspects, the lead shape measurement apparatus of a fourth aspect of this invention is additionally provided with upper surface photographing means which photographs from directly above an external lead to be measured, and two-dimensional measurement means which measures two-dimensional shape in a horizontal direction of said external leads to be measured, in an image plane of a photograph of said upper surface photographing means.

A fifth aspect of this invention includes first perspective imaging apparatus which photographs external leads to be measured, from an angle, second perspective imaging apparatus which photographs external leads to be measured, from an angle differing from that of the first perspective imaging apparatus and so as to include a same photographic field of vision as the first perspective imaging apparatus, laser light projection means which projects a measurement diagram comprising a point, line or a combination of both to a portion inserted into the photographic field of vision for the external lead to be measured, and measurement point determination means which uses the measurement diagram to determine a measurement sampling point which is the same point in both an image plane by a photograph of the first perspective imaging apparatus, and an image plane by a photograph of the second perspective imaging apparatus.

In addition to the configuration of the fifth aspect, the lead shape measurement apparatus of a sixth aspect of this invention has laser light means provided as means for projection of the measurement diagram so that the measurement diagram shows a linear shape, and for the formation of a plural number of projected lines.

In addition to the configuration of the fifth aspect, in the lead shape measurement apparatus of a seventh aspect of this invention laser light means is provided with means for projection of said measurement diagram so that the measurement diagram shows a cross shape.

In addition to the configuration of the fifth to seventh aspects, the lead shape measurement apparatus of an eighth aspect of this invention is additionally provided with position adjustment means which changes a relative position relationship between an external lead to be measured, and first and second perspective imaging apparatus.

In addition to the configuration of the fifth to the eighth aspects of this invention, the lead shape measurement apparatus of a ninth aspect of this invention is additionally provided with laser spot projection means as the laser projection means which projects a spot as a measurement diagram, and measurement point determination means which uses the measurement diagram to determine a measurement sampling point which is the same point in both an image plane by a photograph of the first perspective imaging apparatus, and an image plane by a photograph of the second perspective imaging apparatus.

In addition to the configuration of the fifth to the eighth aspects of this invention, the lead shape measurement apparatus of a tenth aspect is additionally provided with laser spot projection means as the laser projection means which projects a spot as a measurement diagram, and measurement point determination means which in an image plane by the first perspective imaging apparatus, determines one point on the measurement diagram as a measurement sampling point, and in an image plane by the first perspective imaging apparatus, sets an epipolar line on the basis of sight lines when the measurement sampling point of the first perspective imaging apparatus is photographed, and determines a center point of two intersecting virtual straight lines which intersect two ridges of the external leads to be measured in the image plane.

In addition to a configuration of the fifth to the tenth aspects, the lead shape measurement apparatus of an eleventh aspect of this invention is additionally provided with upper surface photographing means which photographs from directly above an external lead to be measured and two-dimensional measurement means which measures two-dimensional shape in a horizontal direction of the external leads to be measured, in an image plane of a photograph of the upper surface photographing means.

According to the basic configuration of the present invention, it is possible to measure a three-dimensional shape of an external lead by oblique photography and so it is possible to automatically measure all external leads when they are still attached to a package.

According to the first aspect of the present invention, the contour line is used as the ridge for recognition and measurement of the center point in the sectional surface of the external lead is performed and so even if there is some deviation of the focus in the image, it is still possible to have accurate measurement for as long as a sectional shape of an external lead is accurately rectangular.

According to the second aspect of the present invention, the edge line is used as the ridge for recognition and measurement of the center point across the width of the external lead is performed and so even if there is some deviation of the focus in the image, it is still possible to have accurate measurement for as long as a sectional shape of an external lead is accurately rectangular.

According to the third aspect of the present invention, the relative position relationship between an external lead to be measured is changed and so it is possible to always obtain image information for the optimum focus and so it is possible to perform extremely accurate measurement.

Furthermore, the external lead image is divided into a plural number of images for a small region of the field of view of the photographing apparatus and it is possible to perform fine measurements by setting the measurement sampling point finely.

Also notable is that the relative position relationship between an external lead to be measured can be adjusted and so even if there are restrictions on use because of problems with the focussing depth of optical systems, it is still possible to use a high-magnification and high-resolution optical system.

According to the fourth aspect of the present invention, the external leads to be measured are photographed from directly above and the image made the material for measurement and so it is possible to have measurement of a two-dimensional shape such as a curve of an external lead in the horizontal direction. Accordingly, the data of those results and the measurement results by an epipolar line are referred to so that it is possible to have measurement to even higher accuracies.

According to the fifth aspect of the present invention, a laser light projection means projects a measurement diagram comprising a point, line or a combination of both to an external lead to be measured and that projection enables a clear measurement sampling point in the image to be given and so it is possible to have measurement to even higher accuracies.

In addition, it is possible to have a simple measurement process since it is not necessary to have the recognition of the ridge as in claims 1 through 5 for the present invention.

According to the sixth aspect of the present invention, that laser light means is provided as a means for projection of said measurement diagram so that said measurement diagram shows a linear shape, and for the formation of a plural number of projected lines and so the shape formed by two or more lines is taken and twisting of external leads can be measured.

According to the seventh aspect of the present invention, the laser light means is provided with a means for projection of said measurement diagram so that said measurement diagram shows a cross shape and so it is possible to measure the local inclination of a portion of a surface of an external lead.

According to the eigth aspect of the present invention, the relative position relationship between an external lead to be measured is changed and so it is possible to always obtain image information for the optimum focus and so it is possible to perform extremely accurate measurement.

Also, the external lead image is divided into a plural number of images for a small region of the field of view of the photographing apparatus and it is possible to perform fine measurements by setting the measurement sampling point finely.

According to the ninth aspect of the present invention, it is possible to use a measurement diagram projected by a laser projection means as it is, as a measurement sampling point.

According to the tenth aspect of the present invention, a line projected by a laser projection means as a measurement diagram is given so that it is possible to perform measurement using an epipolar line and without setting a virtual line for measurement inside each of the image planes.

According to the eleventh aspect of the present invention, an image taken from directly above the external leads to be measured is made the material for measurement and so it is possible to have two-dimensional measurement for curvature in the horizontal direction for external leads.

Accordingly, it is possible to measure the shape of external leads for the horizontal direction of a package and without having to perform measurement using an epipolar line.

In addition, if there is joint measurement using an epipolar line, then the measurement results by image photography from above and the measurement results from the use of an epipolar line can be referred to so that measurement can be performed to even higher accuracies.

First, according to the basic configuration of the present invention, it is possible to measure a three-dimensional shape of an external lead by oblique photography and so it is possible to automatically measure all external leads when they are still attached to a package.

According to the first aspect of the present invention, the contour line is used as the ridge for recognition and measurement of the center point in the sectional surface of the external lead is performed and so even if there is some deviation of the focus in the image, it is still possible to have accurate measurement for as long as a sectional shape of an external lead is accurately rectangular.

According to the second aspect of the present invention, the edge line is used as the ridge for recognition and measurement of the center point across the width of the external lead is performed and so even if there is some deviation of the focus in the image, it is still possible to have accurate measurement for as long as a sectional shape of an external lead is accurately rectangular.

According to the third aspect of the present invention, the relative position relationship between an external lead to be measured is changed and so it is possible to always obtain image information for the optimum focus and so it is possible to perform extremely accurate measurement.

Furthermore, the external lead image is divided into a plural number of images for a small region of the field of view of the photographing apparatus and it is possible to perform fine measurements by setting the measurement sampling point finely.

Still furthermore, the relative position relationship between an external lead to be measured can be adjusted and so even if there are restrictions on use because of problems with the focussing depth of optical systems, it is still possible to use a high-magnification and high-resolution optical system and for precise and high accuracy measurement to be made.

According to the fourth aspect of the present invention, the external leads to be measured are photographed from directly above and the image made the material for measurement and so it is possible to have measurement of a two-dimensional shape such as a curve of an external lead in the horizontal direction. Accordingly, the data of those results and the measurement results by an epipolar line are referred to so that it is possible to have measurement to even higher accuracies.

According to the fifth aspect of the present invention, a laser light projection means projects a measurement diagram comprising a point, line or a combination of both to an external lead to be measured and that projection enables a clear measurement sampling point in the image to be given and so it is possible to have measurement to even higher accuracies.

According to the sixth aspect of the present invention, that laser light means is provided as a means for projection of said measurement diagram so that said measurement diagram shows a linear shape, and for the formation of a plural number of projected lines and so the shape formed by two or more lines is taken and twisting of external leads can be measured.

According to the seventh aspect of the present invention, the laser light means is provided with a means for projection of said measurement diagram so that said measurement diagram shows a cross shape and so it is possible to measure the local inclination of a portion of a surface of an external lead.

According to the eigth aspect aspect of the present invention, the relative position relationship between an external lead to be measured is changed and so it is possible to always obtain image information for the optimum focus and so it is possible to perform extremely accurate measurement.

Also, the external lead image is divided into a plural number of images for a small region of the field of view of the photographing apparatus and it is possible to perform fine measurements by setting the measurement sampling point finely.

According to the ninth aspect of the present invention, it is possible to use a measurement diagram projected by a laser projection means as it is, as a measurement sampling point.

According to the tenth aspect of the present invention, a line projected by a laser projection means as a measurement diagram is given so that it is possible to perform measurement using an epipolar line and without setting a virtual line for measurement inside each of the image planes.

According to the eleventh aspect of the present invention, an image taken from directly above the external leads to be measured is made the material for measurement and so it is possible to have two-dimensional measurement for curvature in the horizontal direction for external leads.

Accordingly, it is possible to measure the shape of external leads for the horizontal direction of a package and without having to perform measurement using an epipolar line.

In addition, if there is joint measurement using an epipolar line, then the measurement results by image photography from above and the measurement results from the use of an epipolar line can be referred to so that measurement can be performed to even higher accuracies.

BRIEF DESCRIPTION OF THE DRAWINGS

FIG. 10 is a view for describing the principle of the measurement method of a point-shaped object using the three-dimensional using epipolar lines;

FIG. 11 is a view for describing the principle of the measurement method of a line-shaped object using the three-dimensional using epipolar lines;

FIG. 15 is a front view of a photographing status and a spot projection status for the system shown in FIG. 12;

DETAILED DESCRIPTION OF THE PREFERRED EMBODIMENTS

The following is a description of the preferred embodiments of the present invention, with reference to the appended drawings.

Figures 7A, 7B:
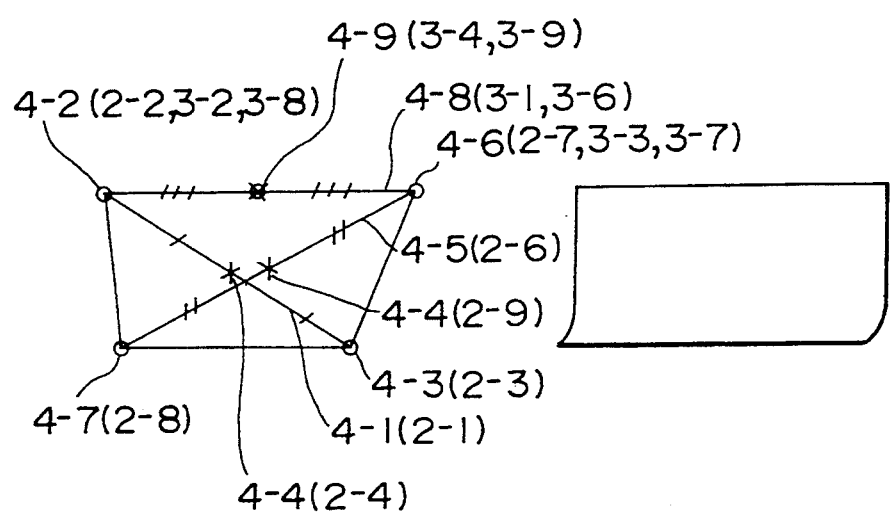
FIGS. 7A and 7B are views for describing the principle of the measurement method shown in FIGS. 2 and 3.
Figure 8:
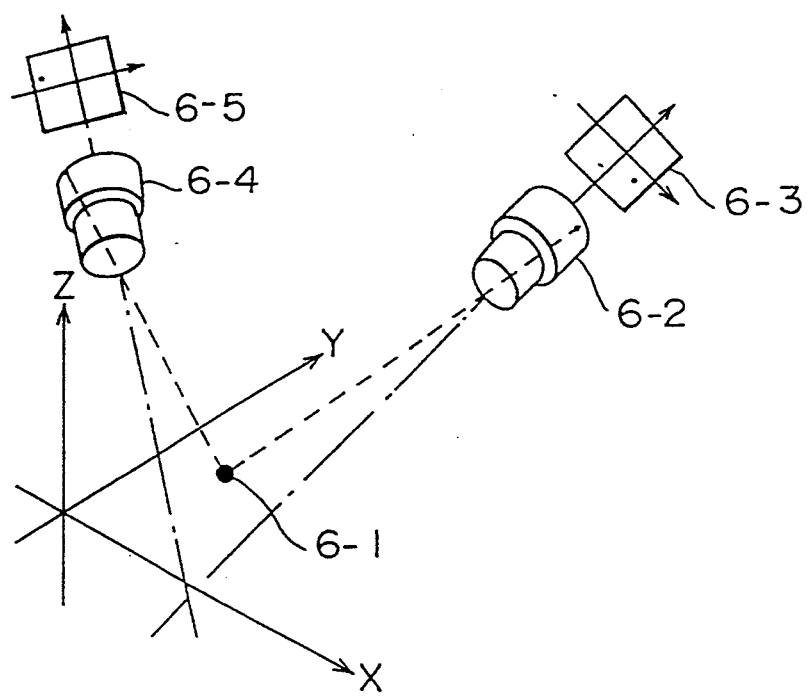
FIG. 8 is a view for describing the principle of measuring a line-shaped object using the three-dimensional by stereovision.
Figure 9:
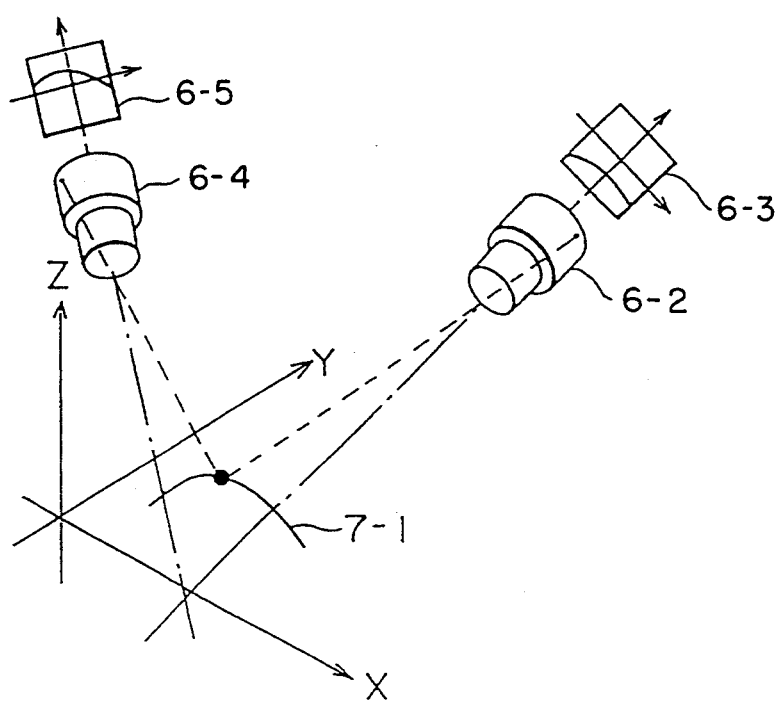
FIG. 9 is a view for describing the principle of measuring a line-shaped object using the three-dimensional method using stereovision.

FIG. 3 through FIG. 7 are views describing the lead shape measurement apparatus relating to a first embodiment of the present invention, FIG. 8 and FIG. 9 are views for describing the principle of the measurement method termed the stereovision method and which is used in the apparatus described above, FIG. 10 and FIG. 11 are views for describing the principle of the measurement method using epipolar lines as a further development.

In the present embodiment, there is photographing of the same leads from different directions by stereovision, that is, by using two television cameras, and a plural number of same points on each of the two two-dimensional image planes for the two cameras are determined and the shape of the lead is measured from the shapes of those groups of points.

In the use of this technique, the degree to which the same point in the two two-dimensional image planes can be determined is an important element, and in the present embodiment, an epipolar line is used for the determination of the same point.

Here, prior to a description of the present embodiment will be a description of the problems in determining the same points by stereovision and of the basic principle of the method which uses epipolar lines and which solves these problems.

As shown in FIG. 8, the stereovision method photographs the object 6-1 in a three-dimensional space by the television cameras 6-2, 6-4, and determines the three-dimensional coordinates from the two-dimensional positions inside the image plane. Moreover, 6-3, 6-5 are the image planes of the each of the television cameras 5-2, 5-4.

With this method, if the object is a dot shape as is the object 6-1, then the two-dimensional position in the respective image planes can be determined relatively easily and the three-dimensional positions in space subsequently determined. However, as shown in FIG. 9, when the object is a line shape as is the object 7-1, then it is difficult to determine the same point on the object 7-1 in the respective image planes and so it is not possible to easily determine the three-dimensional positions of the line-shaped object 7-1.

One known method of solving this problem involves the use of epipolar lines. As shown in FIG. 10, an epipolar line is a line which is obtained by a sight line 8-6 for an object 8-1 being photographed by one television camera 8-4, obtained as a virtual line by another television camera 8-2, and can be determined as an epipolar line on an image plane 8-3 of television camera 8-2. The meaning of this epipolar line is that the object 8-1 exists upon the sight line 8-6 and the line which is a projection of this sight line 8-6 is the epipolar line 8-7 and so in the image plane of the television camera 8-2, the image of the object 8-1 is always taken on the epipolar line 8-7.

An application of this is when a line-shaped object 9-1 such as that shown in FIG. 11 is the object, then first, the one point 9-8 on the image of the object 9-1 on the image plane 9-5 of the television camera 9-4 is determined, and the epipolar line 9-7 corresponding to that is determined on the image plane 9-3 of the television camera 9-2, and the point of intersection 9-9 of an image of the object 9-1 in the image plane of that television camera 9-2 and an epipolar line 9-7 is determined and then the point 9-8 and the point 9-9 can be said to be the same point on the object 9-1. Accordingly, it is possible to determine the three-dimensional position of one point on the object 9-1.

In this manner, according to this method using epipolar lines, it is possible to definitely determine a same point in two different two-dimensional image planes.

Figure 3:
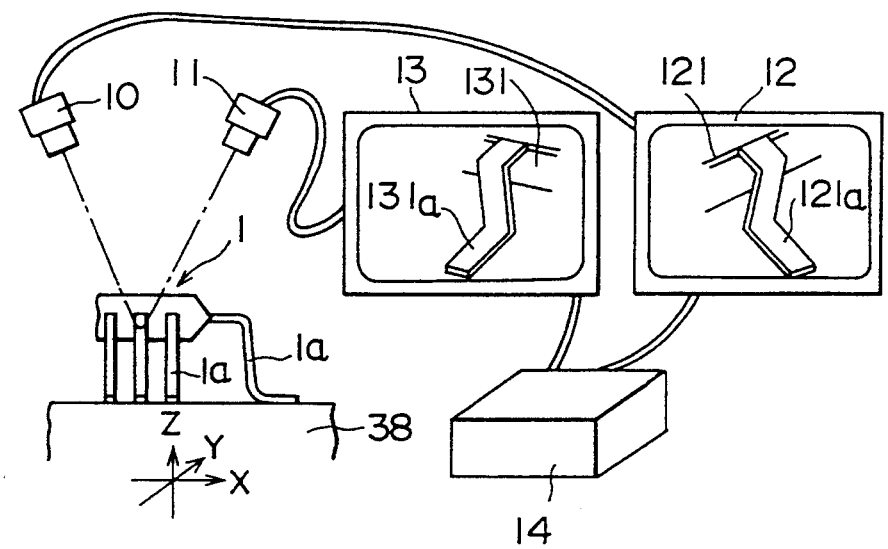
FIG. 3 is a view showing the system configuration of a lead shape measurement apparatus relating to a first embodiment of the present invention.

FIG. 3 is a view of a system configuration of lead shape measurement apparatus of an embodiment of the present invention and which uses this method.

In this figure, the numerals 10 and 11 are television cameras, and each of the television cameras 10 and 11 photographs the external leads 1a, 1a of the semiconductor package 1 from a different direction. The numeral 12 denotes an image plane by the television camera 10, the numeral 121 denotes an image of the package 1 inside the image plane 12, the numeral 121a denotes the image of the external lead 1a inside the image plane 12, the numeral 13 denotes the image plane 13 of the television camera 11, the numeral 131 denotes an image of the package 1 inside the image plane 13, the numeral 131a denotes the image of the external lead 1a inside the image plane 13, and the numeral 14 is an image processing apparatus which calculates the shape quantities of the external lead 1a on the basis of the image information of the image planes 12, 13. The image processing apparatus 14 uses the epipolar line method and determines a plural number of same points in the image plane 13 and the image processing apparatus 14, and uses the shape of those lines of points to calculate the quantities (three-dimensional shapes) for the leads.

Numeral 38 is an XYZ table, and measurement of the package 1 is performed when the package 1 is mounted on the XYZ table 38. Accordingly, the relative position relationships of the television camera 10 and the television camera 11 and the external lead 1a can be changed by this XYZ table 38.

The following is a detailed description of the image processing performed by the image processing apparatus. Basically, if the same points are determined, then the three-dimensional shape of a line of those points can be determined. The following is a description of how those same points are determined.

There are two methods for achieving this.

The first example is of a method which measures the center of a sectional surface of an external lead 1a.

Figures 4A, 4B:
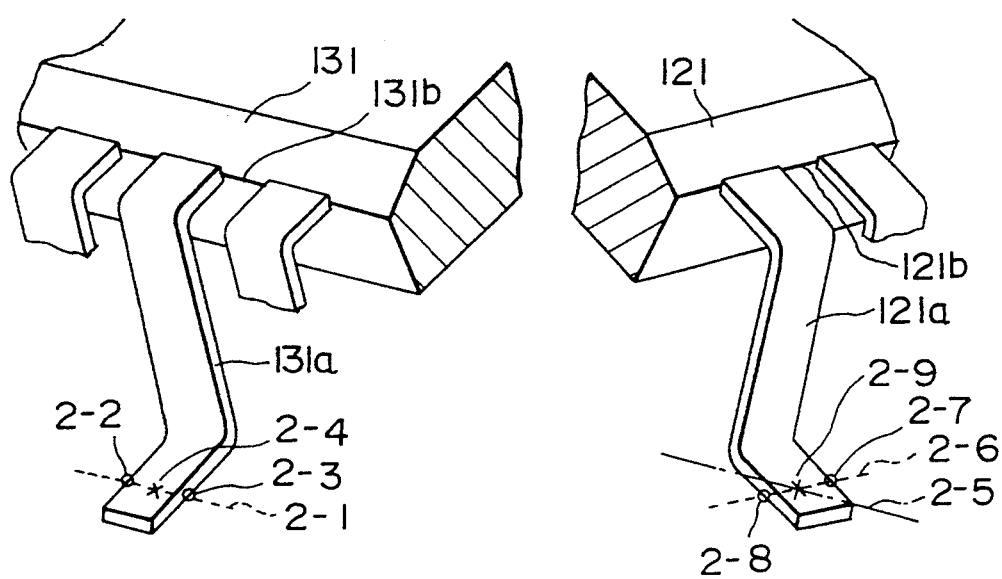
FIGS. 4A and 4B are enlarged views of an external lead image, for describing one measurement method by the system shown in FIG. 1.
Figure 5A:
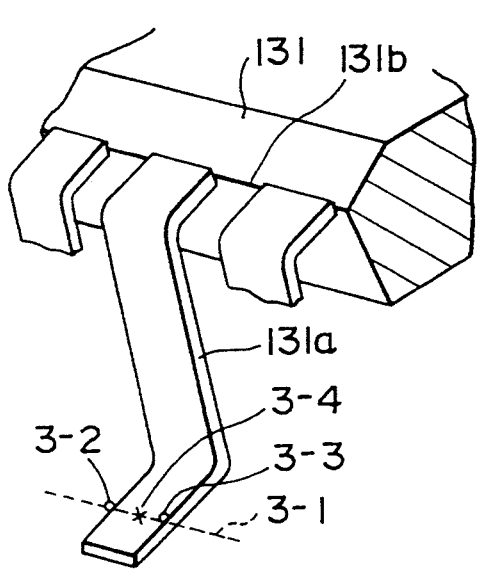
FIGS. 5A and 5B are enlarged views of an external lead image, for describing another measurement method by the system shown in FIG. 1.
Figure 5B:
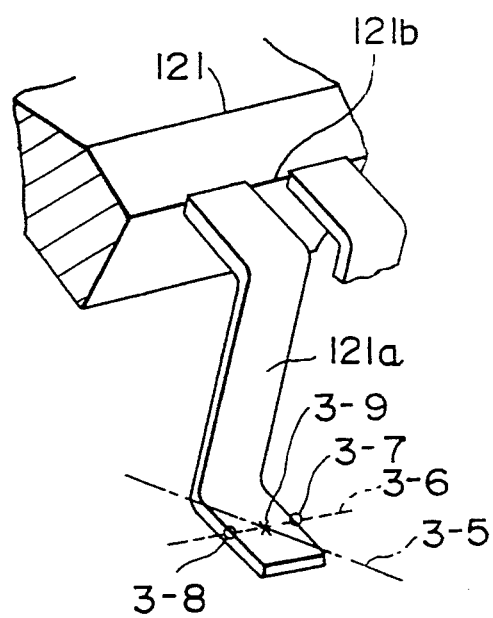

As shown in FIGS. 4A and 4B, an arbitrary position of an external lead image 131a in the two-dimensional image plane 13 from one of the television camera 11 is made the point of interest and a line 2-1 parallel to the contour line 131b of the object in the package image 131 is assumed. Then, the points of intersection 2-2, 2-3 between the contour of the external lead image 131a and the line 2-1 are determined and furthermore, the center point 2-4 is also determined. This center point 2-4 is determined as a measurement sampling point for the external lead 1a.

Then, the epipolar line 2-5 which is the sight line for the television camera 11 in the two-dimensional image plane from the other television camera 10 is determined, and the point 2-9 which is the center point between the points of intersection 2-7, 2-8 of the contour of the external lead image 121a and the line 2-6 parallel to the contour line 121b of the object of the package 121 and which is a point through which this epipolar line 2-5 passes, is then determined. This point 2-9 and the point 2-4 are the same point and the determined three-dimensional coordinates are determined from these two points 2-4, 2-9 so that there is measurement of the center of the sectional surface of the external lead 1a.

Figure 6:
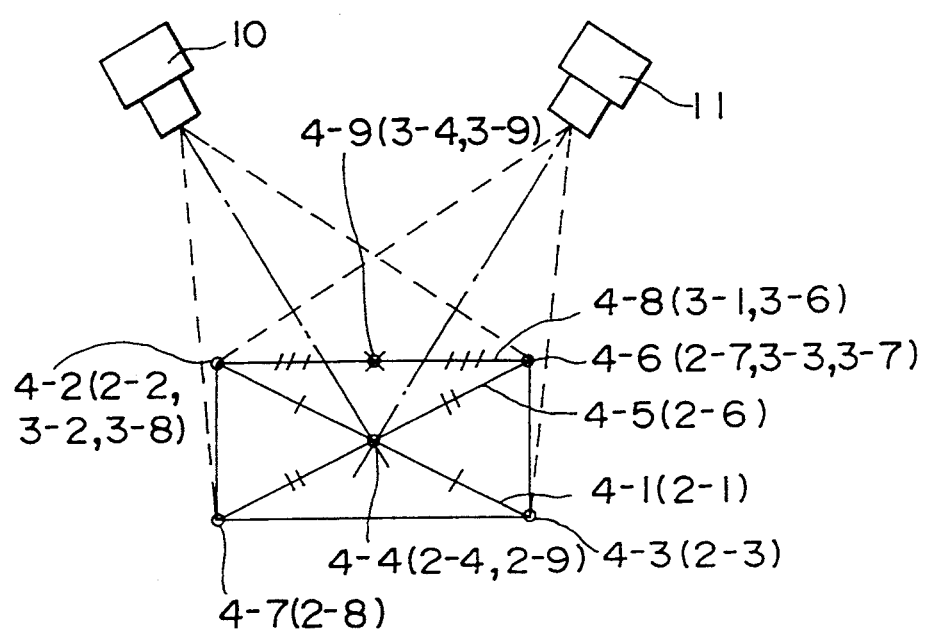
FIG. 6 is a view for describing the principle of the measurement method shown in FIGS. 2 and 3.

More specifically, when the sectional surface of the external lead 1a fits into the rectangular shape shown in FIG. 6, the line 2-1 corresponds to one of the opposing lines 4-1, and the points 2-2, 2-3 respectively correspond to the points 4-2, 4-3 at the ends of the opposing line 4-1. In addition, the line 2-6 corresponds to one of the opposing lines 4-5, and the points 2-7, 2-8 respectively correspond to the points 4-6, 4-7 at the ends of the opposing line 4-5. Also, the line 2-9 corresponds to the center point 4-4 of the opposing lines 4-1, 4-5. The center points of the two opposing lines 4-1, 4-5 of the rectangle are the same point 4-4 and the method shown in FIGS. 5A and 5B uses this principle to determined the point 2-9.

The second example is a method which measures the center point on a surface of an external lead 1a.

As shown in FIG. 5, an arbitrary position of an external lead image 131a in the two-dimensional image plane from one of the television cameras 11 is made the point of interest and a line 3-1 parallel to the contour line 131b of the object in the package image 131 is assumed. Then, the points of intersection 3-2, 3-3 between the contour of the external lead image 131a and the line 3-1 are determined and furthermore, the center point 3-4 is also determined. This center point 3-4 is determined as a measurement sampling point for the external lead 1a.

Then, the epipolar line 3-5 which is the sight line for the television camera 11 in the two-dimensional image plane from the other television camera 10 is determined, and the point 3-9 which is the center point between the points of intersection 3-7, 3-8 of the contour of the external lead image 121a and the line 3-6 parallel to the contour line 121b of the object of the package 121 and which is a point through which this epipolar line 3-5 passes, is then determined. This point 3-9 and the point 3-4 are the same point and the determined three-dimensional coordinates are determined from these two points 3-4, 3-9 so that there is measurement of the center of the surface of a portion of the external lead 1a.

The two methods described above in the first and the second examples determine a plural number of measurement sampling points. When this is done, the line of those sampling points forms a shape across the external lead 1a and so the quantities for the shape of the external lead 1a having those can be calculated.

More specifically, when the sectional surface of the external lead 1a fits into the rectangular shape shown in FIG. 6, the line 3-1 corresponds to one side 4-8, and the points 3-2, 3-3 respectively correspond to the points 4-2, 4-6 at the ends of the side 4-8. Also, the center point 3-4 corresponds to the center point 4-9 of the side 4-8, and the line 3-6 corresponds to the side 4-8, and the points 3-7, 3-8 also respectively correspond to the points 4-6, 4-2 at the ends of the side 4-8. Accordingly, the method shown in FIG. 6 determines the center points of the side 4-8 of the rectangle.

The results of measurement using a system such as that described above can be used to determine whether or not a product clears standards for product quality management. For example, external leads have press processes executed so that they are made into the required shapes and the measurement are used to adjust the pressure, stroke and other parameters for the press, as well as for adjustment of the shape and contact status of molds.

According to the embodiment described above, it is possible to measure the three-dimensional shape of external leads by oblique photography and so it is possible to have the automatic measurement of all external leads while they are attached to the package.

Also, in the image plane 12 and the image plane 13 by the two television cameras 10 and 11, the contour line is used as the ridge for recognition and measurement of the center point in the sectional surface of the external lead is performed and so even if there is some deviation of the focus in the image, it is still possible to have accurate measurement for as long as a sectional shape of an external lead is accurately rectangular.

On the other hand, in the image plane 12 and the image plane 13, the edge line of the external lead 1a is used as the ridge for recognition and measurement of the center point across the width of the external lead is performed and so even if there is some deviation of the focus in the image, it is still possible to have accurate measurement for as long as a sectional shape of an external lead is accurately rectangular.

This is to say that with the former method, for as long as a sectional shape of an external lead 1a shown in FIG. 6 is accurately rectangular, then there is agreement between the center point 2-6 of the line 2-1 and the center point of the line 2-6 but as shown in FIG. 7A, if there is distortion in the sectional shape of the external lead 1a, then the center point 2-6 of the line 2-1 and the center point of the line 2-6 are not necessarily in agreement.

With respect to this point, in the case of the latter method, it is possible to definitely determine the same point even if there is some distortion since the center points on the same line are detected.

Accordingly, it can be said that it is desirable that the latter method be used when it cannot be guaranteed that the sectional shape of the external lead 1a is rectangular and has no distortion.

However, when the latter method is used, it is necessary for the focus of the image to be accurately adjusted and it is also necessary that the ridge of the external lead 1a be clear. The reason for this is that for the edge lines of the external lead 1a in the image, there is a clear distinction from the background which forms a contour line but the other edge line does not appear in the image as a clear line as does the contour which enters into the images 121a, 131a of the image of the external lead 1a. In addition, in the case where the angle of the external lead 1a is a curve as shown in FIG. 7B, the unclarity increases and it is not possible to make a determination.

With respect to this, the former method produces a clearer image, and so that the contour of the external lead 1a can be determined there is an allowance made for the roundness of the angle of the external lead 1a and for a certain degree of imprecise focussing and that amount of accuracy is obtained.

Accordingly, it is desirable that the system enable selection between the two methods.

According to the embodiment described above, the external lead 1a to be measured is placed on an XYZ table 38 and it is possible to change the relative position relationship between the external lead 1a and the television cameras 10,11 and so it is possible to always obtain image information for the optimum focus and so it is possible to perform extremely accurate measurement.

Furthermore, the external lead image is divided into a plural number of images for a small region of the field of view of the photographing apparatus and it is possible to perform fine measurements by setting the measurement sampling point finely.

Also notable is that the relative position relationship between an external lead to be measured can be adjusted and so even if there are restrictions on use because of problems with the focussing depth of optical systems, it is still possible to use a high-magnification and high-resolution optical system.

Figure 1:
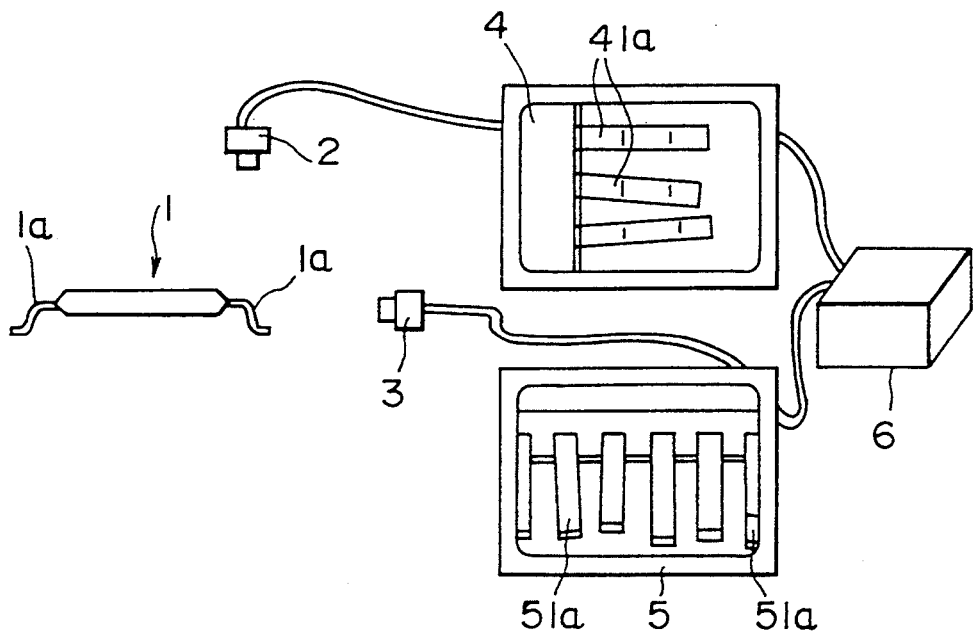
FIG. 1 shows a conventional example of a configuration of a measurement system.
Figure 2:
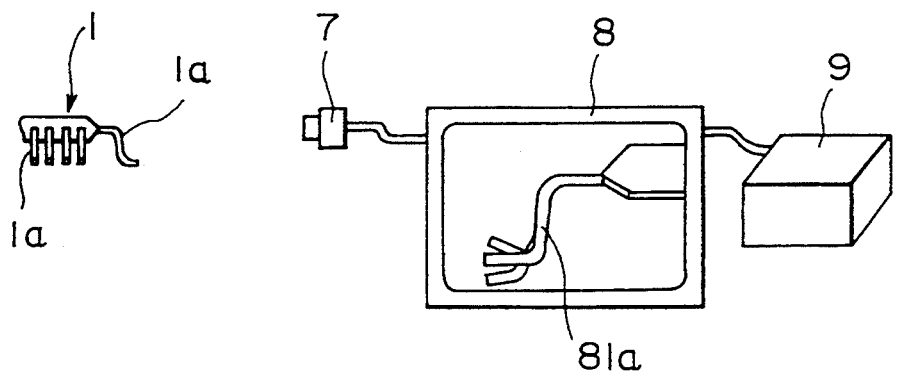
FIG. 2 shows another conventional example of a configuration of a measurement system.

Also, in the apparatus of the embodiment described above, as in the case of the television camera 2 of FIG. 1, the external leads to be measured are photographed from directly above and the image made the material for measurement and so it is possible to have measurement of a two-dimensional shape such as a curve of an external lead in the horizontal direction. Accordingly, the data of those results and the measurement results by an epipolar line are referred to so that it is possible to have measurement to even higher accuracies.

By this, it is possible to measure a two-dimensional shape of a curvature in a horizontal direction for the external lead 1a using only an image of the external lead 1a to be measured when photographed from directly above. Accordingly, it is possible to perform measurement to higher accuracies if the data of these results is used along with the measurement results from using epipolar lines.

The feature of the present embodiment is in the formation of a clear measurement portion as a point inside an image plane.

Figure 12:
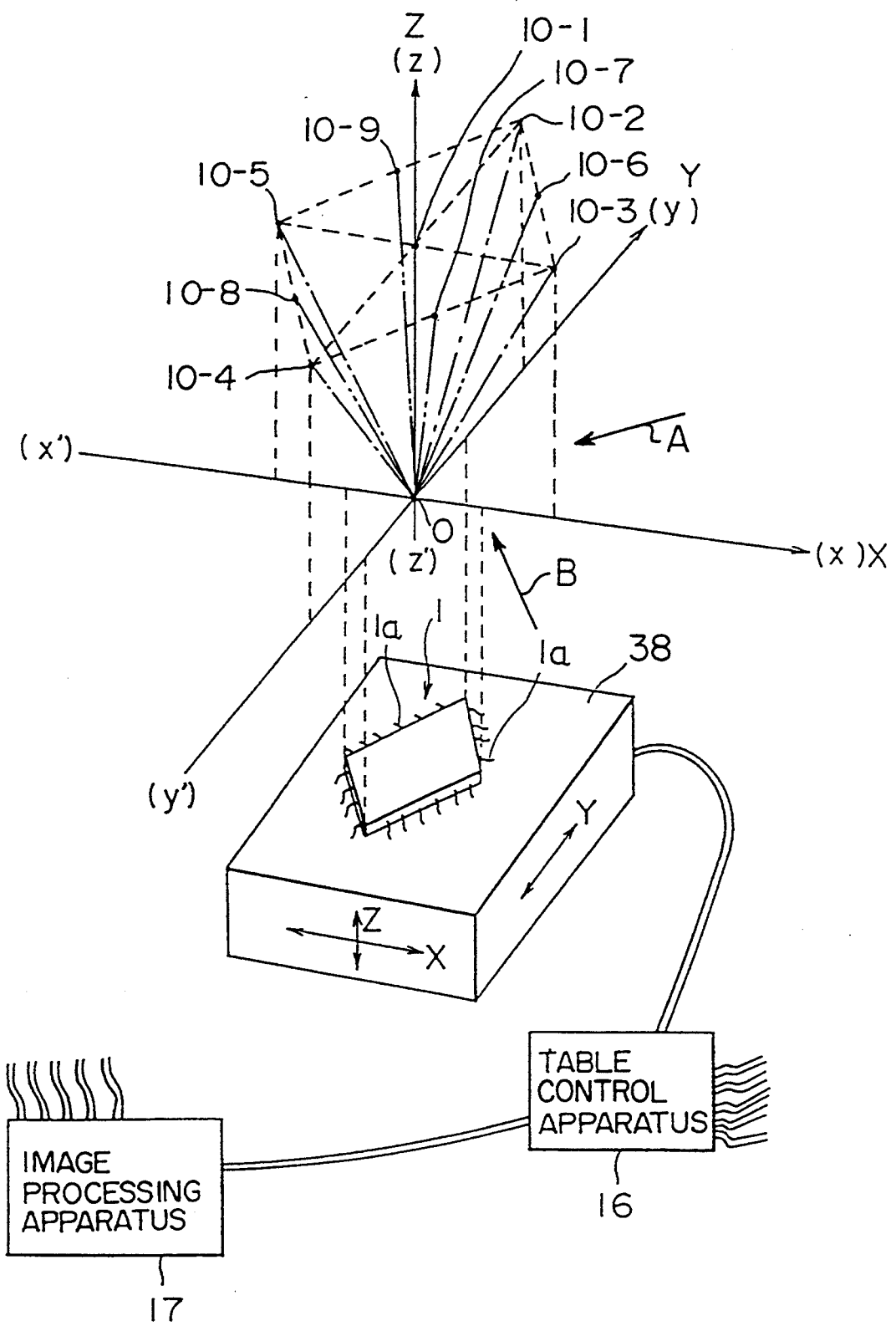
FIG. 12 is a view showing the system configuration of a lead shape measurement apparatus relating to a second embodiment of the present invention.

Referring to FIG. 12 the numeral 38 is an XYZ table and measurement is performed in the status where the package 1 is mounted on the XYZ table 38, each of the side are made parallel so that Y=X or Y=−X, and so that they are vertical with respect to the Z axis, that is so measurement is performed in the status where there is 45° rotation with respect to the XY axes and so that there is the horizontal status.

Moreover, in the figure, the package 1 is drawn as being lower than the origin O of the XYZ three-dimensional region but this is only to prevent the diagram from becoming more complex, and in actuality, the operation of the XYZ table 38 moves all of the external leads 1a, 1a, ... of the package 1 one at a time and at that base position to the distal end portion, to the position of the origin O.

Here, this coordinate system can be thought of as the X axis being divided into the axial line x (>0) and the axial line x' (<0) with the origin O, and the Y axis being divided into the axial line y (>0) and the axial line y' (<0) with the origin O, and the Z axis being divided into the axial line z (>0) and the axial line z' (<0) with the origin O.

Television cameras are provided to one point on the axial line z in this coordinate system (that is, the position directly above the origin O) 10-1, the position expressed by the one point 10-2 on the yOz plane (that is, the first image limit on the YZ plane), the position expressed by the one point 10-3 on the xOz plane (that is, the second image limit on the XZ plane), the position expressed by the one point 10-4 on the y'Oz plane (that is, the second image limit on the YZ plane), and the position expressed by the one point 10-5 on the x'Oz plane (that is, the second image limit on the XZ plane).

One laser spot projector is provided at the position shown by the center point 10-6 which links the point 10-2 and the point 10-3, the position shown by the center point 10-7 which links the point 10-3 and the point 10-4, the position shown by the center point 10-8 which links the point 10-4 and the point 10-5, and the position shown by the center point 10-9 which links the point 10-5 and the point 10-6.

All of the television cameras and projectors are inclined so that their optical axes intersect at the origin O, and are each fixed at positions so that there is no deviation in their direction or relative position relationships.

The television camera shown at the position 10-1 has an illumination device built into it and this illumination device is also directed towards the origin O, so as to light the origin O and its periphery, with the origin at the center.

Accordingly, when an external lead 1a is positioned at the origin O, when that external lead 1a is thought of as a mirror with a front surface and a rear surface, a spot of light is irradiated by a projector positioned in the region of the front side of the external lead 1a and in the same manner, the television camera positioned in the region on the front side photographs either all or part of a portion which includes the portion to which the spot is being irradiated to the external lead 1a. Here, the degree of brightness of the spot light is sufficiently high, and is sufficient for the television camera to produce a clear image.

Figure 13:
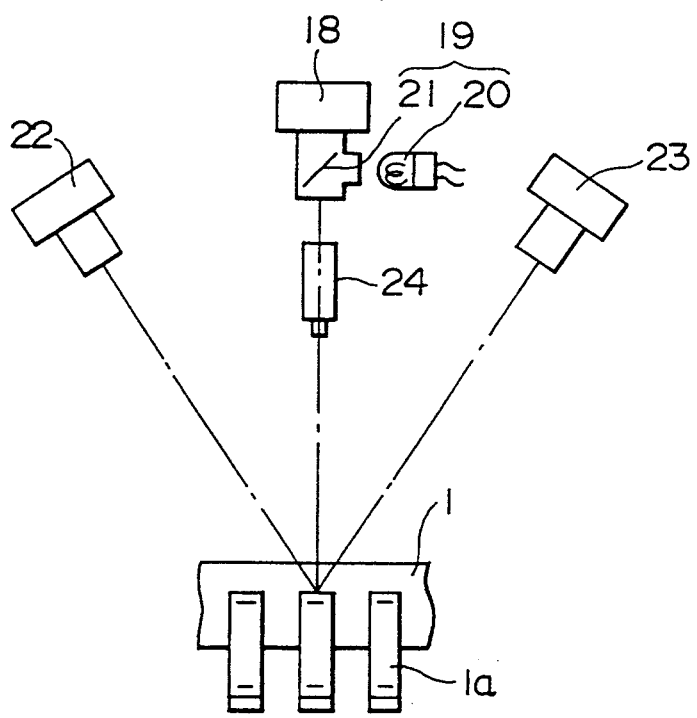
FIG. 13 is a front view of a photographing status and a spot projection status for the system shown in FIG. 10.
Figure 14:
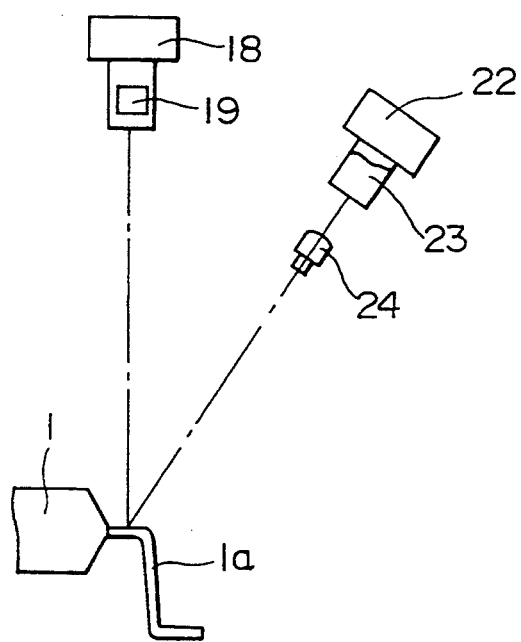
FIG. 14 is a front view of a photographing status and a spot projection status for the system shown in FIG. 10.

FIG. 13 through FIG. 15 show this, and in these figures, the numeral 18 denotes a television camera at the position shown by the point 10-1, the numeral 19 shows an illumination apparatus built into the television camera 18, the numerals 22, 23 denote television cameras positioned at the front side of the external lead 1a which is the measurement object, the numeral 24 denotes a laser spot projection apparatus positioned at the front side of the external lead 1a which is the measurement object, and the numeral 25 denotes a spot which is projected by the projector 24. For example, in the status where the center of the package 1 is positioned so as to be in agreement with the origin, then FIG. 13 can be thought of as the view when seen from the direction of the arrow A of FIG. 12 and FIG. 14 can be thought of as the view when seen from the direction of the arrow B of FIG. 12, and the external lead 1a is positioned at the first image limit for the XY plane, the television camera 22 is the television camera positioned at the point 10-2, the television camera 23 is the television camera positioned at the point 10-3, the projector 24 is the projector positioned at the point 10-6, and an external lead 1a positioned at the first image limit uses the television cameras positioned at the points 10-1, 10-2, 10-3, and the projector positioned at the point 10-6. In addition, an external lead 1a positioned at the second image limit in the XY plane uses the television cameras positioned at the points 10-1, 10-2, 10-5, and the projector positioned at the point 10-9, while an external lead 1a positioned at the third image limit in the XY plane uses the television cameras positioned at the points 10-1, 10-4, 10-5, and the projector positioned at the point 10-8, while an external lead 1a positioned at the fourth image limit uses the television cameras positioned at the points 10-1, 10-3, 10-4, and the projector positioned at the point 10-7.

The illumination apparatus 19 comprises a light source light 20 and a mirror 21, and the light from the light source light 20 is reflected by the mirror 21 to be projected in the periphery of the origin O. The mirror 21 is a half mirror and a television camera 18 positioned on the rear side photographs the periphery of that origin O through the mirror 21.

FIG. 16 is a view showing the contents of the image information from each of the television cameras 18, 22, 23, and the numeral 26 is an image plane of the television camera 18, the numeral 261 is an image of a package 1 inside the image plane 26, the numeral 261a is an image of an external lead 1a inside the same image plane, the numeral 2625 is an image of the spot 25 inside the same image plane 26, the numeral 27 is an image plane of the television camera 22, the numeral 271 is an image of a package 1 inside the image plane 27, the numeral 271a is an image of an external lead 1a inside the same image plane, the numeral 2725 is an image of the spot 25 inside the same image plane 27, the numeral 28 is an image plane of the television camera 23, the numeral 281 is an image of a package 1 inside the image plane 28, the numeral 281a is an image of an external lead 1a inside the same image plane, and the numeral 2825 is an image of the spot 25 inside the same image plane 28.

As shown in FIG. 12, the numeral 16 is a table control apparatus and on the basis of operation commands from the image processing apparatus and which will be described later, performs drive control of the illumination apparatus, the projectors and the XYZ table 38.

The numeral 17 is an image processing apparatus and this image processing apparatus 17 has the functions of performing control of the positioning of the external lead 1a to the origin O, light adjustment-selection-on/off for the projectors, light adjustment-selection-on/off for the illumination apparatus, and measurement calculation for the shape of the external lead 1a on the basis of the image information from the television cameras.

More specifically, the image processing apparatus 17 turns on the illumination apparatus at an arbitrary timing prior to the commencement of measurement, and adjusts the light to the required brightness.

In addition, the image processing apparatus 17 inputs information for the outline of the entire package 1 and which includes information for the respective external leads 1a, beforehand, and the image processing apparatus 17 creates the three-dimensional positions and the shape of the outline of each of the external leads 1a from this information and the posture of the package 1. In accordance with the directionality of the external lead 1a which has been positioned the image processing apparatus 17 uses this preset information as the basis for selecting the projector 24 which is most suitable for projection of a spot and which is on the side of the front of that external lead 1a, and for applying projector drive commands to switch that projector on, to the control apparatus 16. When this is done, the projector 24 selected by the control apparatus 16 is turned on, and a spot of laser light from that projector 24 is projected to a measurement sampling point of the external lead 1a, and light is reflected from that measurement sampling point.

Then, at the same time as the start of measurement of the external lead 1a which is the object of measurement, and in accordance with the outline tracking based on the present information, the image processing apparatus 17 moves the stage 38 via the control apparatus 16 so that the external lead 1a which is the object of measurement substantially passes through the origin O, and while the external lead 1a is moving, the stage 15 is intermittently stopped, and image information taken from the television camera 18 while the external lead 1a is stopped, and the contour lines 261b,261c of both edges of the external lead 1a which is the object of measurement are recognized.

When this is done, the stopping interval differs according to the required accuracy, and for example, when a cavity portion or a curved portion of the external lead 1a is to be determined finely, the setting for the stop positions is performed for as fine as is possible so as to enable a higher degree of accuracy of measurement for the smaller the distances.

In addition, when there is this intermittent motion, the shape applied as the preset information is a three-dimensional shape and so the stage 38 moves from the root of the external lead 1a to the distal end in the XY direction while there is also movement in the direction of the Z axis, and photography is possible in the status where there is always focus.

In this manner, after the measurement of the two-dimensional shape of the external lead 1a, the image processing apparatus 17 uses these measurement results so that the lens spot 25 comes to the position in the center of the width of the external lead 1a and intermittently moves the stage 38 from the root of the external lead 1a to the distal end.

By this intermittent movement and the stopping intervals, it is possible to set an arbitrary degree of accuracy required.

In addition, the two-dimensional contour of the external lead 1a is recognized by measurement by image information of the television camera 18 and so it is possible to always control the spot so that it strikes a position at the center of the width of the external lead 1a when the external lead 1a has a curve in the horizontal direction.

Then, when there is a stop to the intermittent motion, the image processing apparatus 17 uses the image information from the television cameras 22, 23 as the basis for the successive measurement of the three-dimensional position and using the laser spot 25 as the target.

The image processing apparatus 17 then uses these results to determine the three-dimensional shape of the line of points obtained from the laser spot 25 for the external lead 1a which is the object of measurement.

Successive repetitions of these processes for each of the external leads 1a completes the measurement for all of the external leads 1a.

According to the embodiment described above, a diagram for measurement is projected to the external lead 1a by a laser projector 24 and clear measurement sampling points are obtained in the image because of this projection and so it is possible to perform high accuracy measurement.

In addition, it is not necessary to use the ridge recognition process of the epipolar line method used in the first embodiment and so it is possible for the measurement process to be simplified by that much.

Furthermore, the relative position relationships between the external lead 1a which is the object of measurement and the television cameras 22, 23 can be changed and so image information which is always in focus can be obtained and so it is possible to have measurement to an extremely high accuracy.

Then, the field of vision of the television cameras 22, 23 is made small and the field of vision is made narrow and to have a large magnification such as in the external lead images 271a, 281a and this combined with setting the measurement sampling points finely enables fine measurement to be performed.

In this second embodiment, there were five television cameras and four laser spots projectors and these were switched in accordance with necessity but the numbers can be reduced, and the semiconductor package 1, or the group of television cameras, illumination apparatus or the laser spot projectors can be rotated through 90° or 180°.

In addition, the semiconductor package 1 was moved in the XYZ directions but the group of television cameras, illumination apparatus or the laser spot projectors can be moved.

In addition, for example, if the group of television cameras, illumination apparatus or laser spot projectors is moved in the XY direction and the semiconductor package moved in the Z direction, then the XYZ movement function can be divided across the side with the groups of television cameras, illumination apparatus and laser spot projectors.

There can also be provided a configuration in which the relative position relationships between the group of television cameras, illumination apparatus and laser spot projectors can be changed. For example, in the case where there is movement to measure the point array such as shown in FIG. 15, the configuration can be such that the television cameras 22, 23 do not move, and that only the laser spot projectors 24 are moved either mechanically, or optically through the use of mirrors or the like.

Figure 17A:
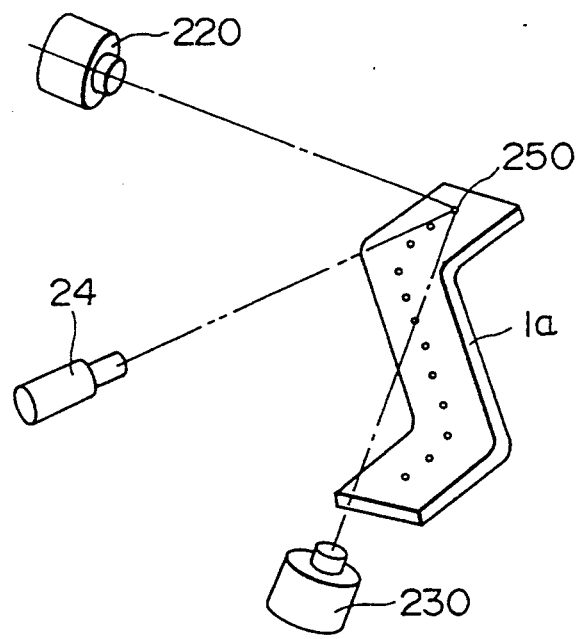
FIG. 17A is a schematically sectional view showing a modified example for performing a spot projection by using a position sensitive device (PSD)
Figure 17B:
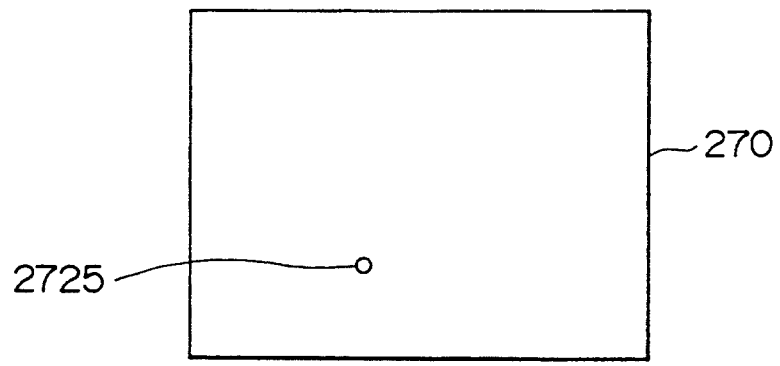
FIG. 17B and 17C are views showing photoreceptive planes of PSDs.
Figure 17C:
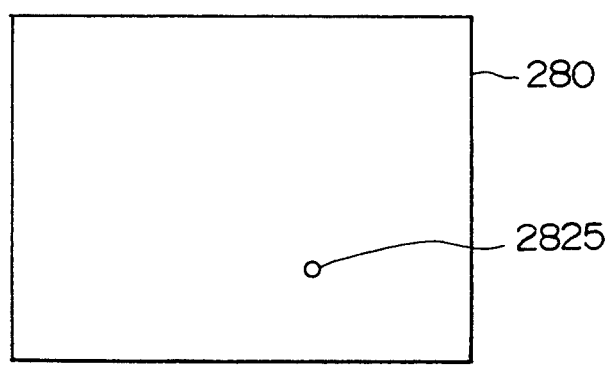

Furthermore, as a modified example of the second embodiment, there may be used a position sensitive devices (abbreviated as PSDs hereinafter) 220 and 230 as shown in FIGS. 17A, 17B and 17C, in the place of the television cameras. The PSDs 220 and 230 are called two-dimensional PSDs for detecting a position in a predetermined region on a plane of two dimension. As shown in FIG. 17A, the PSD 220 is provided in the place of the television camera 22 and the PSD 230 is provided in the place of the television camera 23. The projector 24 is provided for projecting a spot as a figure for measuring on the external lead as a measured object, and forms a laser spot 250 at an arbitrary point on the external lead 1a in the same manner of FIG. 15.

Figures 16A, 16B, 16C:
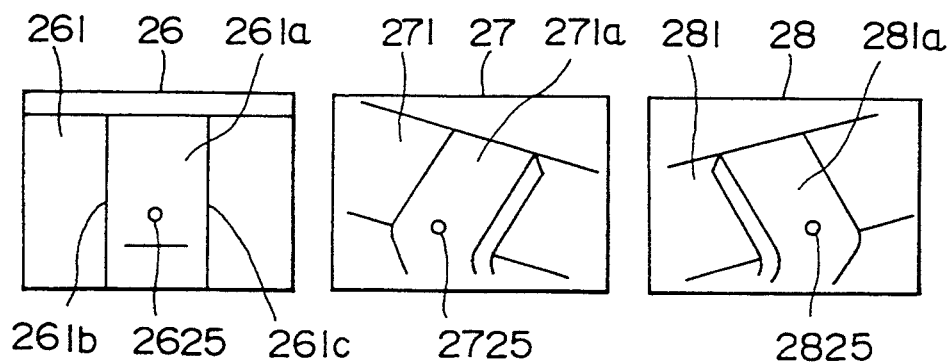
FIGS. 16A–16C are views describing the image plane by a television camera for the system shown in FIG. 10.

On the basis of the above configuration, the laser spot 250 which is projected on the external lead 1a, is detected by the PSDs 220 and 230. This detection substantially corresponds to the operation of the television cameras 22 and 23 as described above by using FIGS. 16B and 16C. However, FIGS. 16B and 16C show the image planes 27 and 28, but FIGS. 17B and 17C show photoreceptive planes 270 and 280, respectively. By the technological level at present, since the PSD can detect light at only one point in the darkness, pictures of the lead 1a and the like are not imaged and images 2725 and 2825 of the spot 250 are only detected, respectively, on the photoreceptive planes 270 and 280. Since the photoreceptive planes 270 and 280 are respectively configured in the manner of generating a different current corresponding to positions of spot images 2725 and 2825, a respective current is detected to perform a predetermined calculation, thereby precisely calculating the position of the spot 250 on the lead 1a.

Because the two-dimensional PSD as the above modified example may not use video signals which is used necessarily in the television cameras and the like, it is unnecessary to perform the operation such as a signal processing and the like, thereby effecting an extreme improvement of the responsive speed in the position detecting operation.

Moreover, it is necessary to have definite correction for the position relationships of the television cameras used on the three-dimensional side when there is stereovision and although it is not a measure for changing the position relationships between pairs of television cameras, the laser spot has the role of a simple target mark and so there is no problem if it is moved. Conversely, there are the advantages of shortening the time for moving the spot, and a subsequent shortening of the measurement time if it is moved.

Figure 18:
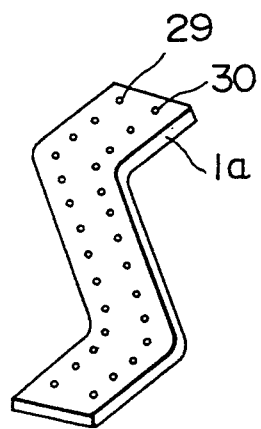
FIG. 18 is a perspective view of an external lead portion and showing the status where a projection spot array has two arrays.

In this second embodiment, measurement of point strings is performed for only one point array but as shown in FIG. 18, it is possible to take two strings at an interval across with width of the external lead 1a. In this case, the projectors can simultaneously generate two parallel laser light beams and simultaneously form two laser spots 29, 30, or one projector 24 can be used to perform measurement of two strings, one at a time. If this is done, then it is also possible to measure twisting of the external lead 1a.

In addition, the spot arrays are not limited in number to one or two, but can be three or more, and can be arranged in any manner. Specific types of measurement are possible depending upon the array.

Figure 19:
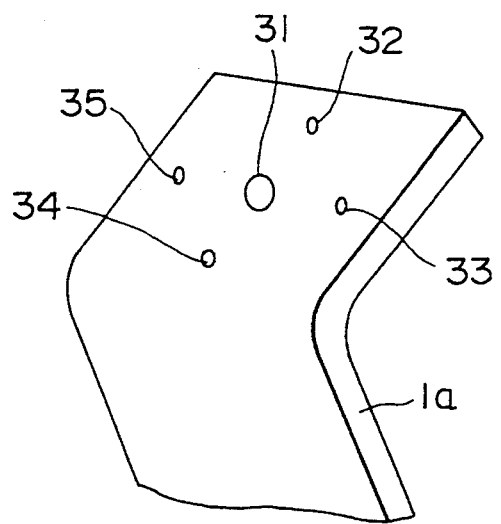
FIG. 19 is a perspective view of an external lead portion and showing the status where a projection spot is a cross shape.

For example, as shown in FIG. 19, when a cross is made on the surface of the external lead 1a, and a spot 31 provided at a position corresponding to the point of intersection of the two lines that configure the cross, and spots 32 through 35 arranged at each of the positions corresponding to both ends of leach line which configure the cross, then these five spots 31 through 35 can be used as the targets for performing measurement. By doing this, it is possible to also measure local inclinations in the surface of the cross region.

Furthermore, the position relationships for the semiconductor package and the television cameras, the illumination apparatus and the laser spot projection apparatus groups, and the position relationships for within those instrument groups are not limited to those described in the embodiments, and it is possible to have spot projection and stereo photography of a portion of an external lead 1a which is to be measured, and the position relationships can be changed in many ways and still achieve a required accuracy.

In addition, in the embodiments described above, the semiconductor package was set horizontally and facing upwards with respect to the instrument group but it is also possible for setting to be performed in many other ways, in accordance with the position with respect to the package itself and the shape of the external leads, and their horizontal inclination and their inclination to the rear. In the embodiments described above, the object of measurement was an external lead 1a of a square package 1 but as for cases where the outer shape of the semiconductor package is pentagonal, and external leads are attached in directions other than those at right angles with respect to the outer sides, a means can be provided for rotational movement of the position relationships between the television cameras, the illumination apparatus and the laser spot projection apparatus groups so that there is rotation in units of less than 90° and so that correspondence can be made for semiconductor packages in which the direction in which the external leads extend is not perpendicular to the sides.

Figure 20:
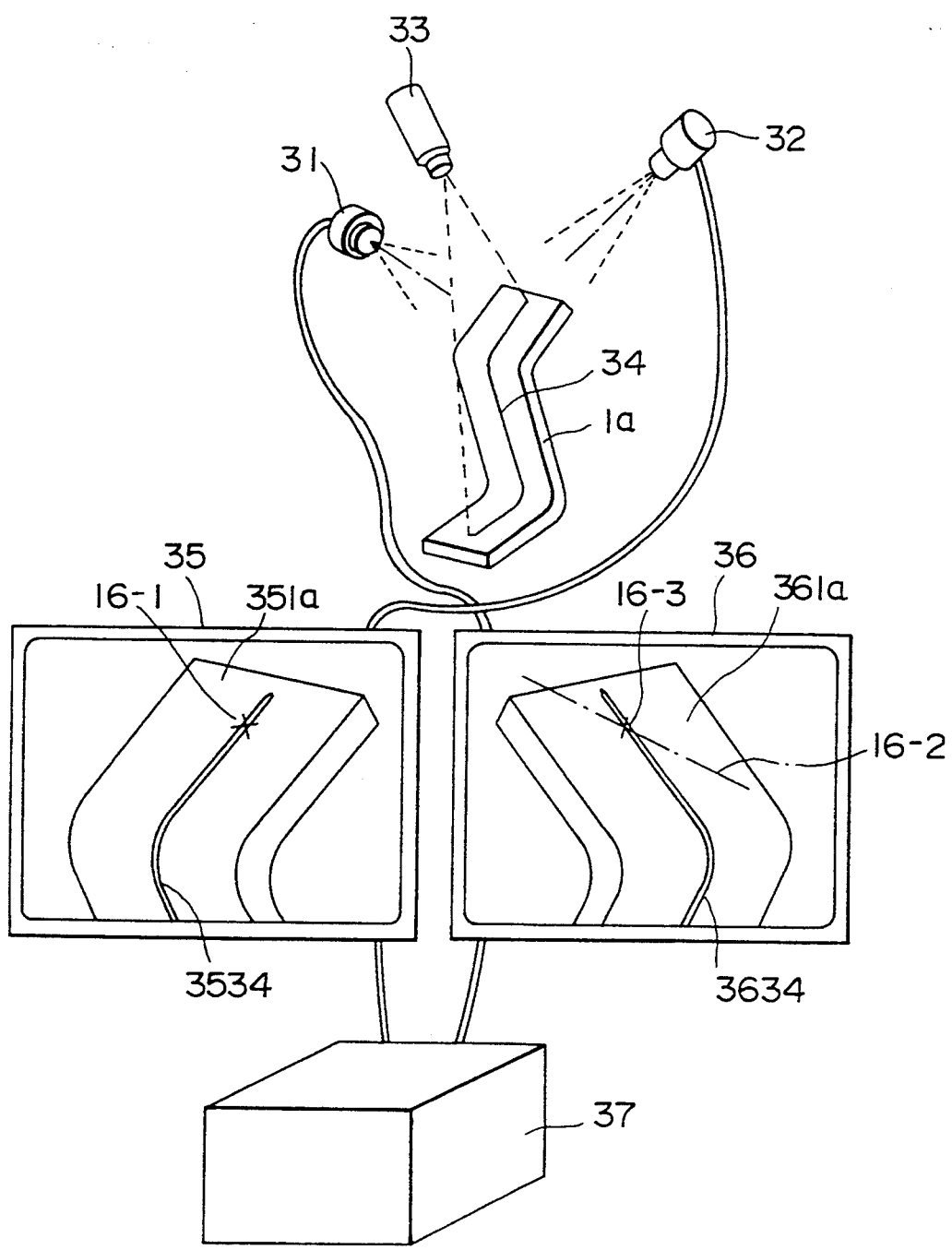
FIG. 20 shows a system configuration of a lead shape measuring apparatus relating to a third embodiment of the present invention.

FIG. 20 shows a system configuration of a lead shape measuring apparatus relating to a third embodiment of the present invention and the feature of this embodiment is that a clear measurement portion is formed in the image plane as a line and this measurement portion is used as the target for performing measurement using the epipolar line method.

The numerals 31,32 are television cameras, and the numeral 33 is a laser projector. The projector 33 generates a laser light in the shape of a line or a slit and so this laser light forms the line 34 on the surface of the external lead 1a.

The numeral 35 is an image plane of the television camera 32, the numeral 351a denotes an image of the package 1 inside the image plane 35, the numeral 3534 denotes the image of the line 34 inside the image plane 13, the numeral 36 is an image plane of the television camera 31, the numeral 361a denotes an image of the package 1 inside the image plane 36, the numeral 3634 denotes the image of the line 34 inside the image plane 36 and the numeral 37 is an image processing apparatus.

The image processing apparatus 37 performs shape measurement of the external lead 1a from the respective two-dimensional image information of the image planes 35, 36. Moreover, in the case of this embodiment as well, although it is not shown in the figure, the package 1 is measured in the status where it is placed on the XYZ table.

The following is a detailed description of this embodiment.

First, an arbitrary one point 16-1 on the line 3534 on the image plane of the television camera 32 is determined, and this is determined as a measurement sampling point. Then, the epipolar line 16-2 is determined on the sight line of the television camera 32 for on the image plane of the television camera 31, and the point of intersection 16-3 of the line 3634 and an epipolar line 16-2 is determined. When this is done, the point 16-3 and the point 16-1 are the same point.

Processing such as this is then repeated at constant intervals for from the vicinity of the root of the external lead 1a to the distal end and shape measurement is performed for the entire external lead 1a.

According to this embodiment, it is also possible to have the same effects as for the second embodiment.

In addition, according to the present embodiment, the measurement diagram is given as a line by the laser projector 33 and so it is possible to perform measurement using an epipolar line and without the setting of a virtual measurement line in each of the image planes 35, 36.

Moreover, in the same manner as for the second embodiment, the number of television cameras and laser projectors is reduced, and the semiconductor package 1, or the television cameras, illumination apparatus or the laser spot projectors can be rotated through 90° or 180°.

In addition, the semiconductor package 1 was moved in the XYZ directions but the group of television cameras, illumination apparatus or the laser spot projectors can be moved, or the movement function can be divided across the side with the groups of television cameras, illumination apparatus and laser spot projectors.

Furthermore, the groups of television cameras, illumination apparatus and laser spot projectors can be provided with a mechanism to change their relative position relationships.

Then, in the third embodiment, the measurement was performed using only one projection slit 34, but as in the case of spots, it is also possible to have the projection of two or more slits across the width of the external lead 1a. In this case, a plural number of laser slits are formed at the same time by the projection of a plural number of parallel laser light beams by the projectors, or only one projector 33 can be used to perform measurement of a plural number of arrays one at a time. If this is done, then twisting of external leads can be measured.

In addition, slit projection of a cross shape can be performed onto the surface of the external lead 1a. Through this, it is possible to measure the local inclination of a portion of a surface of an external lead.

Furthermore, the relative position relationship between the groups of television cameras, illumination apparatus and laser spot projectors can be changed and so it is possible to have various types of settings for the instrument groups with respect to semiconductor packages.

With respect to an external lead to be measured is changed and so it is possible to always obtain image information for the optimum focus and so it is possible to perform extremely accurate measurement.

Also, the external lead image is divided into a plural number of images for a small region of the field of view of the photographing apparatus and it is possible to perform fine measurements by setting the measurement sampling point finely.

According to the ninth aspect of the present invention, it is possible to use a measurement diagram projected by a laser projection means as it is, as a measurement sampling point.

According to the tenth aspect of the present invention, a line projected by a laser projection means as a measurement diagram is given so that it is possible to perform measurement using an epipolar line and without setting a virtual line for measurement inside each of the image planes.

According to the eleventh aspect of the present invention, an image taken from directly above the external leads to be measured is made the material for measurement and so it is possible to have two-dimensional measurement for curvature in the horizontal direction for external leads.

Also noteworthy is that it is possible to divide the projected lines and project them.

This is to say that in this third embodiment, only one slit 34 was formed by the projector 33 but the projector 33 has a depth of focus and so because of the relationship with the shape of the external lead 1a, a sharp fine line is not always obtained and the lines may become wider of out of focus midway.

The slit 34 need note formed all at once, and shorter slits can be formed. In this case, the slit 34 is formed as a short slit on the external lead 1a by the projector 33, and then measurement by that has finished, a reflector plate such as a mirror or changing the position relationship between the projector 33 and the external lead 1a is used to move the projection position for the slit on the external lead 1a. By this, it is possible to always use a clear slit, and for high accuracy measurement to be possible.

Furthermore, the measurement performance using the entire measurement method of the first, second and third embodiments is combined in the one system, and can be selected according to necessity, or used together and each of the measurement results compared so that it is possible to improve the accuracy of measurement.

What is claimed is:

1. A lead shape measurement apparatus having a plurality of imaging devices in which at least two imaging devices image a lead shape from different directions, and forming an image of said lead shape in a stereoscopic vision, comprising:

a first perspective imaging device for photographing external leads to be measured, from an oblique direction;

a second perspective imaging device for photographing external leads to be measured, from an oblique direction different from that of said first perspective imaging device so as to include a same photographic field of vision as said first perspective imaging device;

first measurement point determination means for determining as a measurement sampling point a center point of two intersecting virtual straight lines which intersect two ridges of said external leads to be measured in a first image plane by photography of said first perspective imaging device;

a second measurement point determination means, in a second image plane by said second perspective imaging device, for setting an epipolar line on the basis of sight lines when said measurement sampling point of said first imaging device is photographed, and for determining a center point of two intersecting virtual straight lines which intersect two ridges of said external leads to be measured in said second image plane and which exists upon said epipolar line and for further determining said center point in said second image plane to be specified as a same point as said measurement sampling point; and wherein:

a plurality of measurement sampling points are determined to calculate three-dimensional coordinates determined, with said three-dimensional coordinates being used as the basis for measurement of a three-dimensional shape of said external leads to be measured.

2. The lead shape measurement apparatus according to claim 1, wherein:

first and second measurement point determination means are provided with means for handling a contour line of external leads to be measured, as a ridge which is an object of recognition.

3. The lead shape measurement apparatus according to claim 1, wherein:

first and second measurement point determination means are provided with means for handling a line of an edge of said external leads to be measured, as a ridge which is an object of recognition.

4. The lead shape measurement apparatus according to claim 1, further comprising position adjustment means for changing a relative position relationship between an external lead to be measured, and a first and second oblique image photographing apparatus.

5. The lead shape measurement apparatus according to claim 1, further comprising:

upper surface photographing means which photographs from directly above an external lead to be measured; and two-dimensional measurement means which measures a two-dimensional shape in a horizontal direction of said external leads to be measured, in an image plane of a photograph of said upper surface photographing means.

6. A lead shape measuring apparatus having a plurality of imaging devices in which at least two imaging devices image a lead shape from different directions, and forming an image of said lead shape in a stereoscopic vision, comprising:

a first perspective imaging device for photographing external leads to be measured, from an oblique direction;

a second perspective imaging device for photographing external leads to be measured, from an oblique direction different from that of said first perspective imaging device so as to include a same photographic field of vision as said first perspective imaging device;

laser light projection means for projecting a measurement diagram having one of a point, line and a combination of both point and line to a portion inserted into said photographic field of vision for said external lead to be measured; and measurement point determination means for determining, by using said measurement diagram, a measurement sampling point which corresponds to the same point in both an image plane by a photograph of said first perspective imaging device and an image plane by a photograph of said second perspective device.

7. The lead shape measurement apparatus according to claim 6, wherein:

said laser light means includes means for projecting said measurement diagram so that said measurement diagram shows a linear shape, and for forming plural number of projected lines.

8. The lead shape measurement apparatus according to claim 6, wherein:

said laser light means includes means for projecting said measurement diagram so that said measurement diagram shows a cross shape.

9. The lead shape measurement apparatus according to claims 6, further comprising:

position adjustment means for changing a relative position relationship between an external lead to be measured, and a first and second oblique image photographing apparatus.

10. The lead shape measurement apparatus according to claims 6, further comprising:

laser spot projection means for projecting a spot as a measurement diagram; and measurement point determination means which uses said measurement diagram to determine a measurement sampling point which is the same point in both an image plane by a photograph of said first perspective imaging device, and an image plane by a photograph of said second perspective imaging device.

11. The lead shape measurement apparatus according to claims 6, further comprising:

laser spot projection means for projecting a spot as a measurement diagram; and measurement point determination means which in an image plane by said first oblique image photographing apparatus, determines one point on said measurement diagram as a measurement sampling point, and in an image plane by said first perspective imaging device, sets an epipolar line on the basis of sight lines when said measurement sampling point of said first perspective imaging device is photographed, and determines a center point of two intersecting virtual straight lines which intersect two ridges of said external leads to be measured in said image plane.

12. The lead shape measurement apparatus according to claims 6, further comprising:

upper surface photographing means for photographing from directly above an external lead to be measured; and two-dimensional measurement means for measuring a two-dimensional shape in a horizontal direction of said external leads to be measured, in an image plane of a photograph of said upper surface photographing means.

* * * * *